July 20, 1937.　　　　　G. H. TAY　　　　　2,087,363
JUICE HEATING TANK
Filed Dec. 18, 1936
Fig. 1.
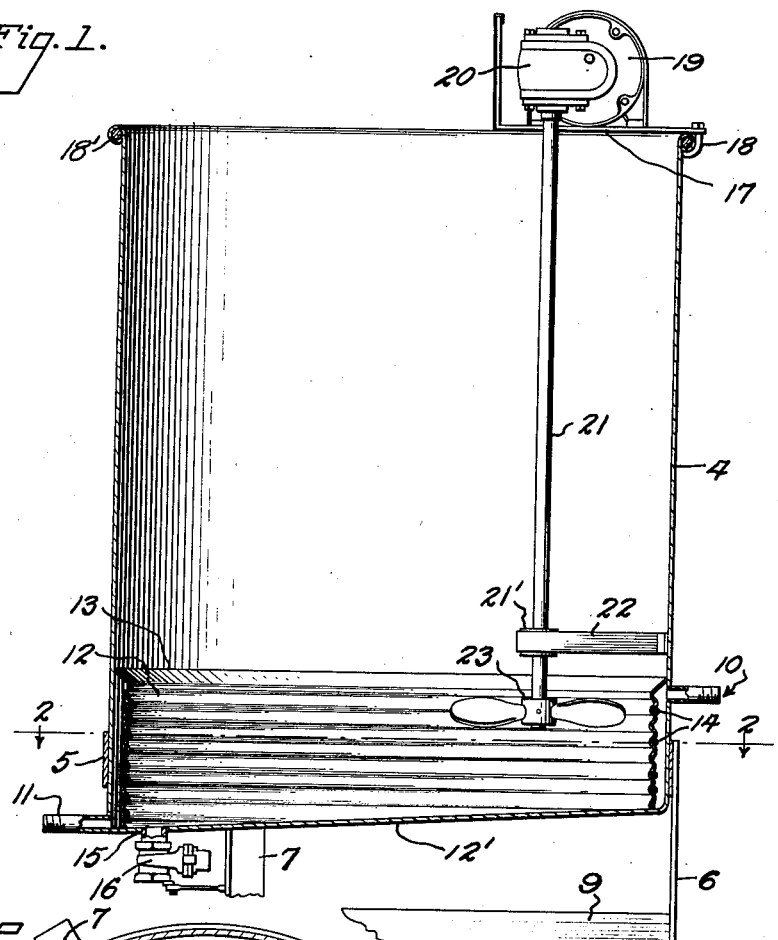
Fig. 2.
Fig. 3.
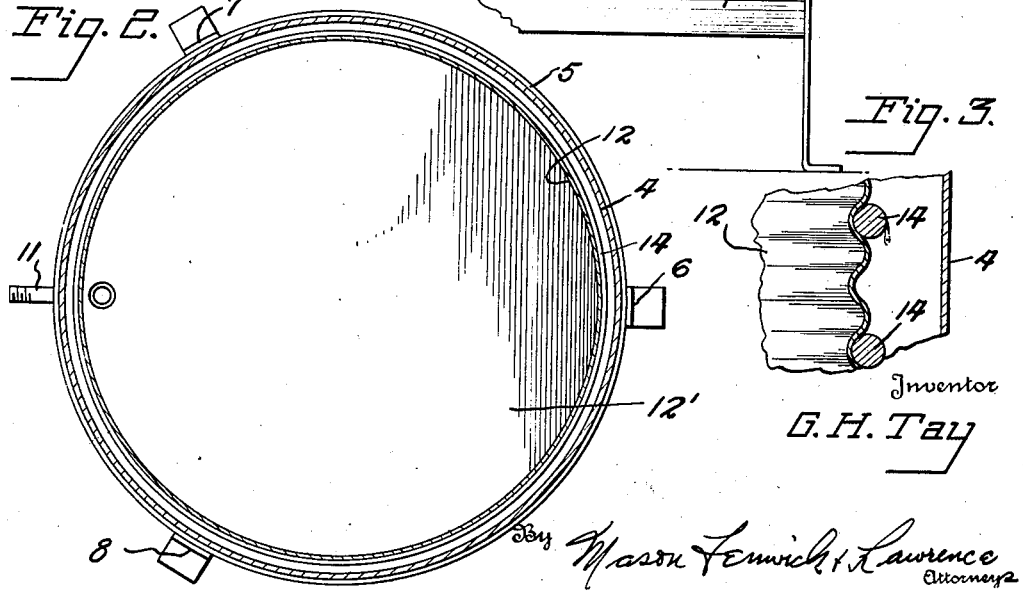
Inventor
G. H. Tay
By Mason Fenwick & Lawrence
Attorneys Patented July 20, 1937

2,087,363

UNITED STATES PATENT OFFICE 2,087,363

JUICE HEATING TANK

George Henry Tay, Philipsburg, Pa., assignor to Lee Metal Products Company, Inc., Philipsburg, Pa.

Application December 18, 1936, Serial No. 116,664

6 Claims. (Cl. 257—106)

The invention forming the subject matter of this application relates generally to improvements in apparatus for applying heat to liquids; and more particularly to apparatus of this character embodying tanks supplying heat through coils to the material treated therein.

In the prior art, it is common to arrange steam heated coils on the bottom of the tank. In the cooking of juices, such as tomato juice, the coils after comparatively short periods of use become caked with solids deposited from the juices cooked therein; and it becomes necessary to remove the coils periodically from the tanks to clean them.

In many cases the deposit on the coils is caused by condensation of steam in the lower parts of the heating coils. Where such condensation occurs, there is a lowering of temperature which causes the juice in contact with the cooler parts of the coil to cake thereon. The deposit acts somewhat as a heat insulator which increases the rate of deposit until the whole coil becomes caked and practically useless until the deposit shall have been removed therefrom.

The main object of the present invention is to provide a juice heating unit of the character described in which the heating element is constructed to prevent the caking of solids thereon, and which can be readily cleaned, when necessary, without removal of the element from the tank.

Other objects will become apparent as the detailed description thereof proceeds.

In the drawing:

Figure 1 is a central vertical section through a preferred from of the invention;

Figure 2 is a horizontal section taken on the line 2—2 of Figure 1; and

Figure 3 is a fragmentary detail, to an enlarged scale, of a part of the heating element.

As shown in the drawing, the invention comprises a cylindrical tank 4 suitably secured, as by welding, to a strap 5 fixed to the upper ends of supporting standards 6, 7, and 8, connected to each other between their upper and lower ends by a brace 9. An inlet 10 and an outlet 11 for steam are connected to diametrically opposite parts of the tank 4, the inlet 10 being secured to the tank near the top edge of a corrugated cylindrical casing 12, supported by the bottom 12' of the tank.

The bottom 12' is inclined downwardly from the inlet side of the tank and the outlet 11 projects from the lowest part of the tank. The outer diameter of the casing 12 is less than the inner diameter of the tank 4; and the casing 12 is provided at its upper edge with a flange 13, the outer edge of which makes a steamtight fit with the inner surface of the tank.

The several corrugations of the casing 12 are parallel to each other and serve to strengthen the wall formed by the casing. Steel rings 14 surrounding the casing 12 may be seated in any desired number of these corrugations to add to the strength of the casing. However, these rings perform an additional function, as they serve to break up or prevent streams of water of condensation forming on the inner wall of the casing. A drain pipe 15 controlled by a gate valve 16 is fixed to the bottom 12' at its lowest part.

A plate 17 extends across the upper end of the tank and is suitably secured thereto by a clamping bolt 18 having its shank bent to engage the bead 18 formed around said end. A motor 19, mounted on the plate 17, has its rotor shaft connected through reducing gears 20 to a beater shaft 21 extending into the tank 4. The shaft 21 is journaled in a bearing 21' carried by a bracket 22 extending inwardly from the wall of the tank 4 near the upper edge of the casing 12. A beater 23 is fixed to the lower end of the shaft 21 in position to keep the contents of the tank in continuous movement along the heated wall of the casing 12.

The prevention of condensation on the outer surface of the casing 12 eliminates the caking of solids on the inner surface and obviates the necessity of removing the heating element for cleaning purposes. Such cleaning of the inner surface of the heater casing as may be necessary after treatment of a batch of juice, can be readily effected by running a swab around the inner corrugated face, with the element in its fixed position.

While I have in the above description disclosed what I have found to be a practical embodiment of the invention, it will be apparent to those skilled in the art that the details of construction as illustrated and described, are merely by way of example and not to be construed as limiting the scope of the invention as defined in the appended claims.

What I claim is:

1. In apparatus for heating liquids, a cylindrical tank, means for supporting said tank in substantially vertical position, and a cylindrical casing in said tank forming a heating chamber within said tank, the wall of said casing being provided with corrugations substantially perpendicular to its axis, and means on the corrugations of the casing within said chamber to prevent the formation of condensate thereon.

2. In apparatus for heating liquids, a cylindrical tank, means for supporting said tank in substantially vertical position, and a cylindrical casing in said tank forming a heating chamber within said tank, the wall of said casing being provided with corrugations substantially perpendicular to its axis, and stiffening rings seated in corrugations of the casing in said chamber.

3. In apparatus for heating liquids, a cylindrical tank, means for supporting said tank in substantially vertical position, and a cylindrical casing in said tank forming a heating chamber within said tank, the wall of said casing being provided with corrugations substantially perpendicular to its axis, and stiffening rings seated in corrugations of the casing in said chamber, said rings being circular in cross section and projecting from the outer surface of said casing to form drip traps for water of condensation on said outer surface.

4. In apparatus for heating liquids, a cylindrical tank, means for supporting said tank in substantially vertical position, and a cylindrical casing in said tank forming a heating chamber within said tank, the wall of said casing being provided with corrugations substantially perpendicular to its axis, and stiffening rings seated in corrugations of the casing in said chamber, said rings being circular in cross section and projecting from the outer surface of said casing to form drip traps for water of condensation on said outer surface, a beater rotatable within said casing, and means for rotating said beater.

5. In apparatus for heating liquids, a cylindrical tank, means for supporting said tank in substantially vertical position, and a cylindrical casing in said tank of smaller diameter than said tank and coaxial therewith to form a heating chamber within said tank, the bottom of said tank being flat and inclined to the horizontal with the casing seated thereon, a steam outlet at the lowest part of said chamber, and a steam inlet near the highest part thereof, and means mounted on the convex surface of said casing within said chamber to prevent the formation of streams of water of condensation.

6. In apparatus for heating liquids, a cylindrical tank, means for supporting said tank in substantially vertical position, and a cylindrical casing in said tank of smaller diameter than said tank and coaxial therewith to form a heating chamber within said tank, the bottom of said tank being flat and inclined to the horizontal with the casing seated thereon, a steam outlet at the lowest part of said chamber, and a steam inlet near the highest part thereof, and means mounted on the convex surface of said casing within said chamber to prevent the formation of streams of water of condensation, a beater rotatable within said casing, and means for rotating said beater.

GEORGE HENRY TAY.